United States Patent
VanAssche et al.

(10) Patent No.: US 6,189,959 B1
(45) Date of Patent: Feb. 20, 2001

(54) DOOR ADJUSTING BUMPER PROVIDING SHOW SURFACE ALIGNMENT

(75) Inventors: Raymond J. VanAssche, Utica; Mark A. Swartz, West Bloomfield; Mark A. Galasso, Orion; Douglas P. Smith, Clarkston, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/456,799

(22) Filed: Dec. 8, 1999

(51) Int. Cl.[7] .................................................. B60R 27/00
(52) U.S. Cl. ...................... 296/207; 296/97.22; 16/86 B; 411/539
(58) Field of Search ................................ 296/97.22, 207; 16/82, 85, 86 R, 86 A, 86 B; 411/539, 537, 238

(56) References Cited

U.S. PATENT DOCUMENTS

| | | |
|---|---|---|
| 4,782,978 | 11/1988 | Appleby et al. . |
| 4,811,984 | 3/1989 | Hempel . |
| 5,044,678 | 9/1991 | Detweiler . |
| 5,165,749 | 11/1992 | Sheppard . |
| 5,421,124 * | 6/1995 | Zuccaro ................................. 49/381 |
| 5,520,431 | 5/1996 | Kapes et al. . |
| 5,836,638 | 11/1998 | Slocum . |
| 5,906,406 * | 5/1999 | Pajakowski ........................ 296/97.22 |
| 6,088,878 * | 7/2000 | Antonucci et al. ................... 16/86 A |
| 6,119,306 * | 9/2000 | Antonucci et al. ................... 16/86 A |

\* cited by examiner

*Primary Examiner*—D. Glenn Dayoan
*Assistant Examiner*—Patricia Engle
(74) *Attorney, Agent, or Firm*—Kenneth H. Maclean

(57) ABSTRACT

An improved cushioning bumper and stop member for a pivotal door such as used to cover a fuel opening in a vehicle body which is designed to be indexed by rotation in its mount to a precise position for establishing the door's closed position to create an outer surface flush with the surrounding surface of a vehicle body. The adjustable cushioning bumper member is mounted in a recessed door mount assembly so that it can be manually indexed by rotation to a desirable optimum position establishing the door's surface at a desired planar orientation relative to the vehicle's adjacent body surface.

7 Claims, 3 Drawing Sheets

DOOR ADJUSTING BUMPER PROVIDING SHOW SURFACE ALIGNMENT

BACKGROUND OF THE INVENTION

1. Field of the Invention.

This invention concerns a readily adjustable device for establishing a closed positioning of a pivoted door with respect to adjacent surfaces so that the outer surfaces thereof are aligned with respect to one another. More particularly this invention is drawn to an improved adjustable bumper and stop member for a vehicle door such as used to cover a fuel opening and which member can be rotated manually to a precise indexed position so that on closure the outer surface of the fuel door is flush with the outer surface of the vehicle body panel to optimize vehicle appearance and streamlining.

2. Description of Related Art.

Previously, vehicles have been utilized housings recessed in the bodywork for providing a hidden fuel inlet. The housing typically provides a pivotal door to conceal the fuel filler opening and the filler cap to improve vehicle appearance and to augment streamlining of the vehicle. Various door mounting constructions have also been devised to permit adjustment of such an access door so that upon closure the outer surface of the door is flush with the surrounding surface of the vehicle body and creates a constant narrow gap therebetween to enhance vehicle appearance and streamlining. For example the U.S. Pat. No. 4,811,984 to Hempel, issued Mar. 14,1989 for a "Lid For Closing An Automobile Body Recess" discloses a housing having a vehicle fuel door with threaded adjustment for locating the door hinge and with a threaded stop for adjustably supporting the free edge of the fuel door when closed for establishing a desired gap uniformity. In U.S. Pat. No. 5,165,749 to Sheppard, issued Nov. 24, 1992 for a "Gas Cap Cover Adjustment Device" discloses a recessed housing with a plural threaded adjustment construction so that the fuel door can be centered with respect to the accommodating opening in the body work of the vehicle and so that the upper surface thereof is aligned with the show surface of the vehicle side panel.

While the prior constructions identified above offer various fuel door adjustments, the remotely located threaded devices which are provided for the adjustment do not accommodate production line standards and requirements to permit an assembler to manually make a quick and precise adjustment for the desired door alignment of the fuel door with the show surface of the surrounding associated vehicle panel.

SUMMARY OF THE INVENTION

An object of this invention is to provide a universal adjustable stop member for a vehicle fuel door that allows an assembler or a service person to easily grasp and manually rotate the stop member for adjusting its stop position and therefore establish a flush alignment of the surfaces of the fuel door and the surrounding vehicle panel. The stop component of this invention resultantly provides for the optimized appearance of the fuel door to meet customer requirements for close fits and part alignment.

In a preferred embodiment of the invention, a bumper and stop device for the free edge of the fuel door is installed directly to the fuel filler housing which is recess mounted within a quarter panel or other body structure of the vehicle. The bumper and door stop member has an attachment construction to the housing which permits rotation about a first axis and an annular door contact and stop surface centered about a second axis which is offset from the first axis. When the bumper and stop member is rotated about the first axis, the offset annular surface provides an adjustable positive stop for the free edge of the fuel door. Upon rotation of the bumper and stop member about the first axis, its annular contact surface adjusts inwardly and outwardly relative to a free edge portion of the fuel door and thus adjusts the door's exterior show surface flush with the exterior show surface of the surrounding vehicle panel and thereby provides a desirable manual adjustability in positioning the fuel door.

In this invention, an improved fuel inlet and closure cap housing assembly is provided for mounting behind an opening in an exterior body panel of a vehicle. The assembly includes a fuel fill cover or door which is pivotally mounted to move between opened and closed operative positions for alternatively accessing and concealing the fuel fill tube. The construction features a manually adjustable door positioning bumper and stop member that cushions the door closure and also positions the free swing edge of the door so that the door's exterior surface lie flush to the body panel's exterior surface. The bumper and stop member is mold formed as a unitary member from resilient elastomer or other suitable material and is mounted directly in a wall of the fuel inlet housing assembly. When the fuel fill door is in its opened position, the bumper and stop member can be readily gripped and manually rotated to a variety of positions to establish a selected positioning which when the door is closed establishes alignment of the door's outer show surface with the show surfaces of the surrounding vehicle body's exterior panel.

The bumper may carry anti-rotation ribs that inhibit unwanted rotation of the bumper and door stop member after adjustment to a desired alignment which unwanted rotation might otherwise be caused by vibrations and cycling of the fuel door open and closed. The bumper and door stop member is engineered to readily accommodate use in many vehicles by its elongated construction so as to provide a relatively wide range of adjustment available in the radial direction as produced by the distance established between the member's two offset axes or distance between the two centerlines. In practice, a preferred bumper and stop member design can be standardized with built-in adjustment ranges to establish desired alignment requirements for many fuel doors in cars and trucks produced on a given assembly line.

The improved fuel door positioning bumper and stop member in a unitary or one piece molded unit from elastomer or other suitable resilient material. The member mounts directly to the recessed mounting assembly and is readily accessible when the fuel door is opened for manual turning by an assembler or technician to establish different positions of the fuel fill door's free edge for thus establishing a desired flush condition with respect to the surrounding body work panel.

BRIEF DESCRIPTION OF THE DRAWINGS

These and other features objects advantages and features will become more apparent from the following detailed description and drawings in which.

DETAILED DESCRIPTION OF THE PREFERRED EMBODIMENT

Figure 1:
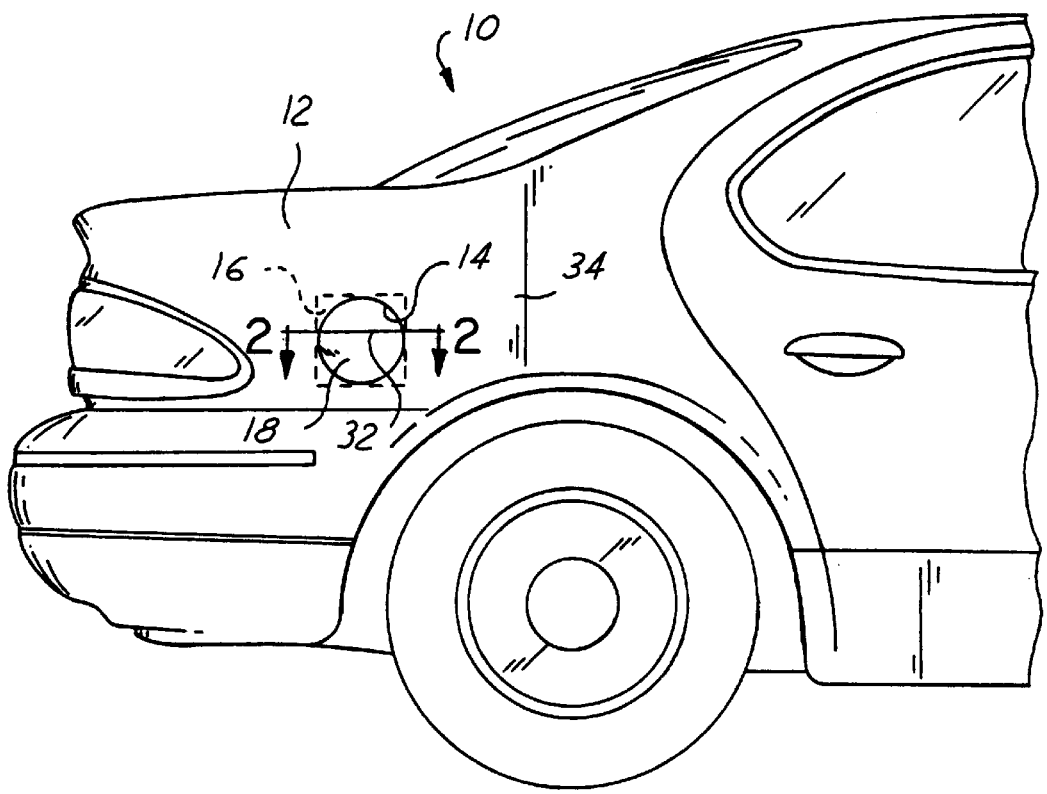
FIG. 1 is a side view of the rear quarter panel of an automotive vehicle.
Figure 3:
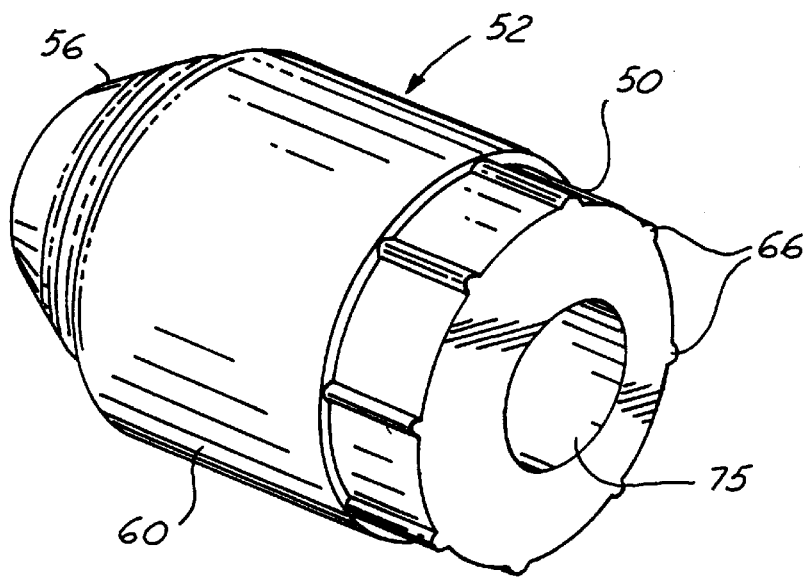
FIG. 3 is a perspective view of a preferred embodiment of the subject bumper and positioner member for the vehicle's fuel fill access door shown in FIG. 2.
Figure 2:
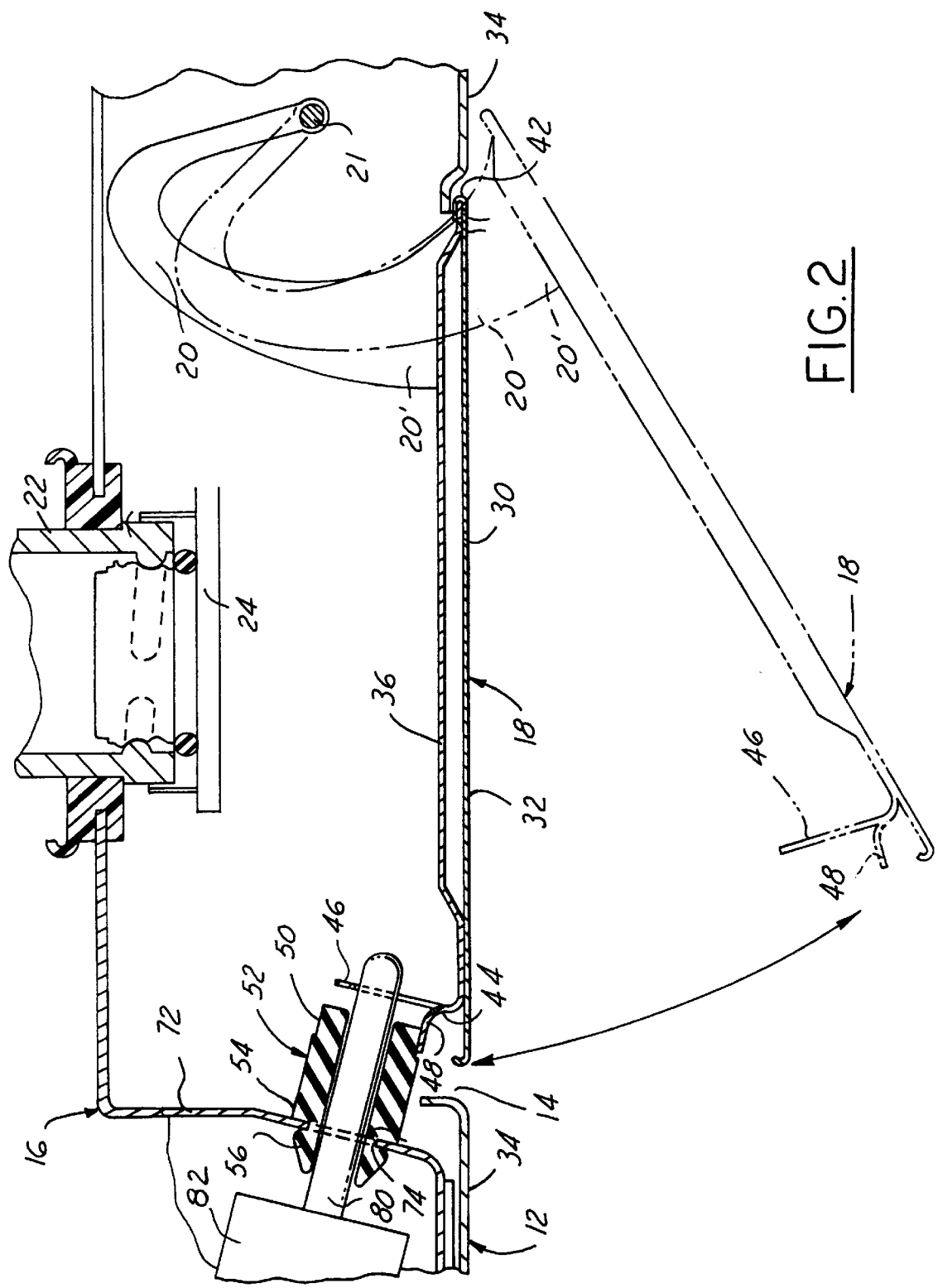
FIG. 2 is a cross sectional top view of a portion of FIG. 1 taken generally along sight lines 2—2 in FIG. 1.

Turning now in greater detail to FIGS. 1 and 2, an exterior surface portion of an automotive vehicle 10 is illustrated. Particularly, a rear quarter panel 12 is shown supporting a generally circular opening 14 therethrough for access to a fuel filler housing assembly 16. The housing assembly 16 is operatively mounted behind the rear quarter panel 12 and is securely attached thereto in operative alignment with the access opening 14. One purpose of the housing assembly is for catching fuel spills. The housing assembly 16 includes an external fuel fill door 18 for covering the opening 14 when closed and for access to the fuel filler when opened. Door 18 is pivotally mounted to the housing 16 by an internal hinge member 20 and an associated over-center spring arrangement (not shown). This allows the door 18 to pivot about the axis of a fixed pivot pin 21 between its opened and closed positions with respect to the quarter panel 12. The housing assembly 16 may be made of any suitable material such sheet metal or a high density plastic material that effectively supports the outer end portion of a gas tank filler tube 22 and its associated removable cap member 24. Note that the housing assembly 16 defines a recessed space for hiding the filler tube 22 and cap member 24.

Figure 6:
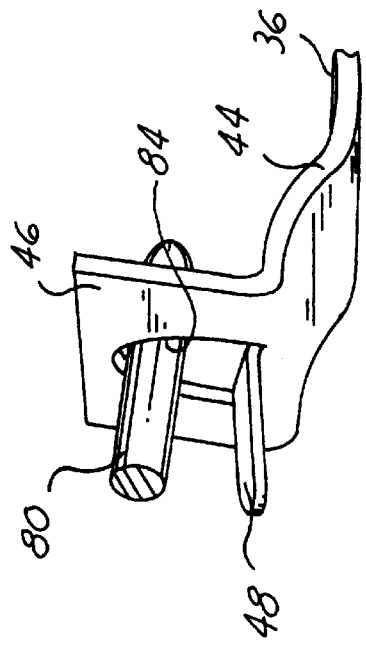
FIG. 6 is a perspective view of a portion of the access door of FIGS. 1 and 2 and a portion of an associated locking rod or bolt for the door.

In the illustrated embodiment of the invention shown in FIG. 1, the fuel door 18 is circular and comprises a flat outer panel 30 whose show surface 32 is aligned with the outer or show surface 34 of the surrounding quarter panel 12. In addition to the outer panel 30, door 18 comprises an interior-reinforcing panel 36 to which the end potion 20' of the hinge member 20 is attached. The mid portion of the inner panel 36 is spaced from the outer panel as shown in FIG. 2 by offset peripheral edge portion 38. Edge portion 38 is captured by a clinched over peripheral portion 40 of the of the outer panel 30 to create a generally circular hem flange 42. At a predetermined point opposite the hinge attachment portion 20', the free or outboard edge portion of the reinforcing panel 36 has an integral and extended tab portion 44 one part of which terminates in an inwardly extending apertured keeper end portion 46 for a latching arrangement best seen in FIG. 6 and described in more detail herein after.

A second end part of the tab portion 44 terminates in a contact tab 48 which extends generally at a right angle with respect to the keeper end portion 46. The contact tab end portion 48 is adapted to contact an annular outer surface or positioning shoulder 50 of an adjustable door positioning bumper and stop member 52. The bumper and stop member 52 preferably has a generally cylindrical configuration and is molded into a one-piece member from a suitable elastomeric material. Preferably, it has sufficient resilience to cushion impacts as the door 18 is closed. The bumper and stop member 52 is treadably mounted to the housing assembly 16 so that it can be adjusted or indexed to a variety of fixed settings or stop positions within the housing which establish the positioning of the free edge of door 18 when it is closed.

Figure 5:
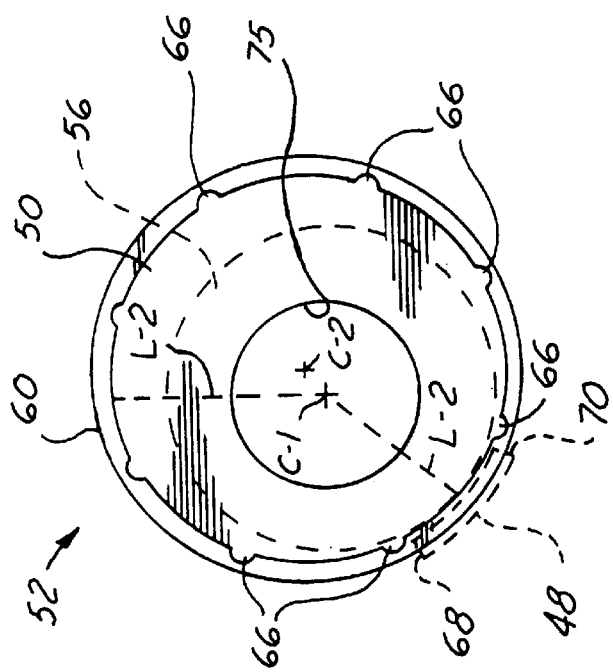
FIG. 5 is an end view of the bumper and positioner member of FIGS. 3 and 4 taken generally along sight lines 5—5 in FIG. 4.
Figure 4:
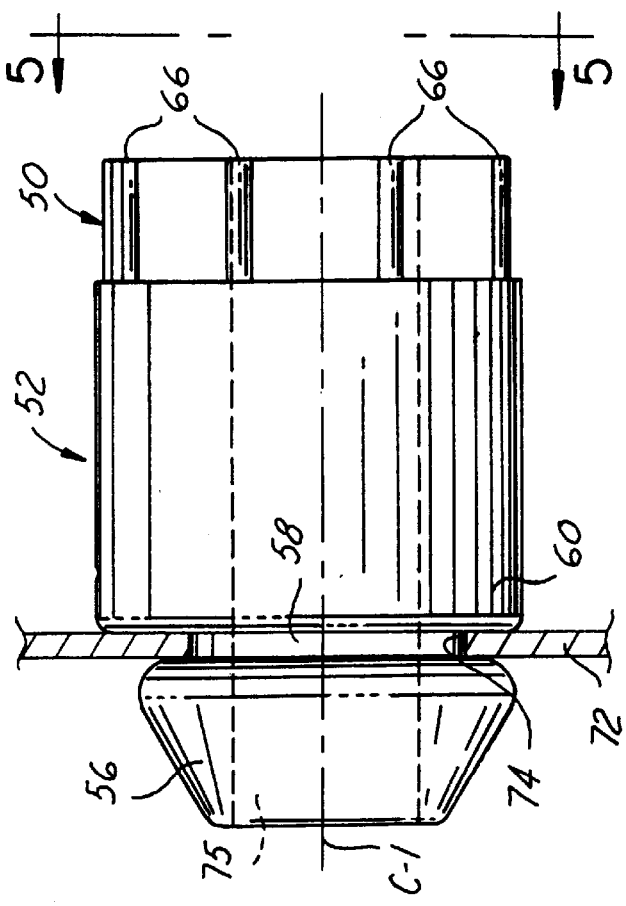
FIG. 4 is a side view of the subject bumper and positioner member of FIG. 3.

The bumper and stop member 52 has at one end a generally conical head portion 56 and an integral necked down portion 58 which are disposed about a center axis C-1 as shown in FIGS. 4 and 5. Neck portion 58 integrally connects with a substantially cylindrical body portion 60 which has a central axis C-2 that is offset a predetermined distance from the center axis C-1 of the head and neck portions 56, 58. This forms an eccentric arrangement as best illustrated in FIG. 5 where the offset of the body portion 60 with respect to the head and neck portions is clearly visible.

The bumper and stop member's shoulder 50 is an axial extension formed at the end of the body portion 60. As best shown in FIGS. 4 and 5, the shoulder 50 is formed with a plurality of radially outwardly and axially extending small rib formations 66 that can be spaced equally from one another. These ribs 66 are adapted to contact the side surfaces or edges 68, 70 of the tab portion 48 to inhibit unwanted rotation of the bumper and stop member 52 once set in a desired orientation. Preferably, the tab portion is formed with an interior curved or arced surface to match the curvature of the contact shoulder 50 as best seen in FIG. 5. This curvature optimizes the cushioning effect of the closing door thereagainst and would decrease wear.

FIGS. 2 and 4 illustrate the mounting of the bumper and stop member 52 to the housing assembly 16 and within the recess formed by it. A side wall 72 of the housing assembly has an annular opening 74 formed therein. Opening 74 has a diameter of sufficient dimension to allow the head portion 56 of the bumper and stop member 52 to be resiliently deformed and pushed therethrough until the neck portion 58 is nested in the opening. During insertion, the elastomer material can readily bulge into a centralized passage 75 to facilitate insertion. When the attachment head subsequently clears the opening, it recovers to its original shape to trap the wall 72 between the head portion 56 and the body portion 60. The fit of the member 52 against wall 72 and about opening 74 is sufficient to maintain the member 52 in a set position. With the door 18 in its opened position, a turning force can be manually applied to the bumper and stop member 52 to rotate it so as to change the relative position between the door's tab portion 48 and the surface 50 when the door is closed.

In the installed position, the door adjusting bumper and stop member 52 is operatively mounted within the housing assembly and serves to positioning the door 18 relative to the vehicle's quarter panel 12 to provide a desired surface alignment.

Referring to FIG. 5, a spacing or lift L-1 is created by the eccentrically disposed shoulder surface 50 of the bumper and stop member 52. If the door is closed and the position of the shoulder is insufficient to effect a desired surface alignment between the fuel door and the quarter panel and a greater lift such as lift L-2 is necessary, an assembler or technician can reopen the door and easily manually turn the bumper and stop member 52 until the desired lift is attained aligned. If closing of the door reveals that the L-2 lift position a less than or more than desired for surface alignment, the door is again opened and the bumper and stop member 52 is again manually turned until the appropriate lift is attained for a desired surface alignment. The various lift positions can be marked with visual indicia on the outer end portion of the bumper for the assembler to indicate the amount of lift there is for each adjusted position.

As mounted, the bumper and stop member has sufficient strength and durability to withstand the cycling of many door closures over the life of the vehicle. If the bumper and stop member 52 somehow becomes unable to perform its function, the old member can be readily removed and replaced by a new member.

If a fuel door locking arrangement is desired, a selectively activated lock/unlock device can be provided which includes an elongated locking pin or bolt 80. The lock/unlock device is mounted adjacent the free end portion of the door 18 and its elongated bolt 80 is movable in an axial direction in response to activation of a solenoid powered actuator 82. When the door 18 is in a locked condition, the bolt 80 extends from the actuator 82, through central opening 75 in the bumper and stop member 52, and then through opening 84 formed in keeper tab 46 of the door's inner panel 36. When an open door 18 is closed, the keeper tab portion first engages the end of the locking bolt 80 which retracts into the actuator 82 against an internal spring (not visible). After the end of the bolt 80 is aligned with the opening 84 in the keeper tab 46, the force of the internal spring moves the bolt 80 through the opening 84. Accordingly, the door 18 is locked in position. Latter when the solenoid is energized, the locking bolt 80 is retracted into the actuator and away from the tab portion 46 to allow the door to be swung to an open position for access to the fuel cap 24. With this locking arrangement, space is effectively utilized and the stability of the bumper 52 is enhanced by the locking bolt.

This invention is not to be limited to the details of construction and methods shown and described for purposes of illustrating the invention for other modifications and methods falling within the scope of the appended claims will now occur to those skilled in the art. The embodiments of the invention in which an exclusive property of privilege are defined as follows.

What is claimed is:

1. In combination with a vehicle outer body of sheet material which defines an interior area and has an exterior show surface, an opening in the outer body defined by an edge portion, the opening providing an access to the interior area, a door operatively fitting within said opening and having an exterior show surface, and a hinge construction operatively mounting said door for swinging, movements between opened and closed positions with respect to said opening, the invention comprising: a unitary bumper and door stop member mounted adjacent to the door in a manner allowing adjustment by turning movements about a turning axis to a plurality of positions, said bumper and door stop member having an outboard end portion carrying a plurality of different door stop surfaces spaced from one another in a circumferential direction and located at varying distances in a radial direction with respect to the turning axis of said bumper and door stop member, said bumper and door stop member being positioned so it is engaged by the door as it is moved to a closed operative position and specifically that one of said selected door stop surfaces is contacted by the door to position the show surface of the door in planar alignment with the show surface of the vehicle outer panel.

2. In an automotive vehicle, an outer panel member having an exterior show surface, an opening in said outer panel for providing access from the exterior of said panel to the interior space thereof, a door having an exterior show surface for covering said opening when in a closed operative position, a hinge construction for the door permitting the door to move between its closed operative position and an opened operative position with respect to said opening, said door having a freely moving edge portion spaced oppositely from said hinge construction, said freely moving edge portion carrying a discrete contact, a bumper and door stop member operatively mounted behind said outer panel and adjacent said freely moving edge portion of said door in a manner permitting turning movements about an axis to a plurality of predetermined stations, said bumper and door stop member defining a peripheral end portion on which a plurality of radially outwardly spaced contact surfaces are presented which contact surfaces correspond to said predetermined stations wherein for said discrete contact on said door engages one of said radially outwardly located contact surfaces so that said location of a closed freely moving edge portion of said door can be adjusted to align with the adjacent show surface of the vehicle outer panel by turning said bumper and door stop member into a predetermined station whereby said discrete door contact engages a selected one of said bumper and door stop member's contact surfaces to align the show surfaces of said door and said outer panel with respect to one another.

3. The construction of claim 2 wherein said bumper and door stop member is a one piece molded unit of elastomer material with a head portion mounted interiorly of said outer panel in a manner permitting rotation about a turning axis and an opposite generally cylindrical portion carrying said contact surfaces, said cylindrical portion and said contact surfaces being disposed about an longitudinal axis offset from said turning axis of rotation of said bumper and door stop member so that said contact surfaces are at varying radial distances from the turning axis thus defining an eccentric relationship thereto.

4. The construction defined in claim 3 wherein said contact surface is formed at the end of the cylindrical portion and each of said stations are separated from one another by axial ribs projecting slightly outwardly from the periphery of said contact surfaces so that said door's discrete contact extends between said ribs so that said discrete contact's side edges are engaged by said ribs to inhibit unintended turning of said bumper and door stop member.

5. The construction defined in claim 4 wherein said door's discrete member defines an apertured keeper portion and wherein an elongated locking bolt extends axially through said bumper and door stop member into engagement with said keeper to retain said door in a closed position and an actuator connected to said locking bolt for selectively moving said locking bolt from engagement with said keeper to unlock said door and allow said door to move to the opened position.

6. An vehicle having an access opening in an exterior body panel to define a recess in which a inlet end portion of a fuel fill tube is positioned, an access door with an outer surface covering said opening when in a closed operative position, a hinge construction operatively connected to said access door for pivotally mounting said access door to permit swinging movement between the closed position to an opened position with respect to said access opening, said door having a free edge portion opposite said hinge construction and movable with respect to said vehicle body panel, a bumper and door stop member for adjustably positioning said access door, support structure within said body panel for operatively supporting said bumper and door stop member so that it extends beyond the body panel edge which defines said access opening, said bumper and door stop member having an end portion with a plurality of contact surface, spaced thereabout defining a plurality of door stop positions, said door's free edge carrying a contact member for engaging any one of said bumper and stop member's contact surfaces when said door moves into its closed operative position, and an adjustment construction allowing said bumper and stop member to be selectively adjusted so as to change the position of the door's free edge portion when closed thereby aligning said door's outer surface with the vehicle's outer surface.

7. An automotive vehicle body having an outer panel with an access opening therethrough to a recessed space and with an inlet neck of a fill tube of the fuel tank of the vehicle therein, an access door covering said opening when in a closed operative position, a hinge construction operatively connected to said door and said body for pivotally mounting said access door for limited swinging movement on said body between opened and closed positions with respect to said opening to therefore provide selectively access to said inlet neck of the fill tube, a bumper and door stop member associated with said access door operatively mounted adjacent to the edge of said opening opposite the hinge construction, said bumper and door stop member having a contact surface thereabout with a varying radially distance from its central axis, the contact surface providing a plurality of contact positions space circumferentially from one another so as to position the free edge of said door in a range of positions relative to the surrounding surface of the body's outer panel, said free edge of said door carrying a contact tab member for engaging any one of said contact positions, and a mounting construction of said bumper and door stop member allowing a selective manual rotation of said bumper and door stop member with respect to said door's contact tab member to thereby adjust the position the door's free edge portion so as to align the door's outer surface substantially flush with the body's outer surface.

* * * * *